(12) United States Patent
Hopkinson

(10) Patent No.: US 10,601,208 B2
(45) Date of Patent: Mar. 24, 2020

(54) OPTIMIZED CABLE RACEWAY AND METHODS

(71) Applicant: COMMSCOPE, INC. OF NORTH CAROLINA, Hickory, NC (US)

(72) Inventor: Wayne C. Hopkinson, Hickory, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 16/099,028

(22) PCT Filed: May 8, 2017

(86) PCT No.: PCT/US2017/031565
§ 371 (c)(1),
(2) Date: Nov. 5, 2018

(87) PCT Pub. No.: WO2017/193128
PCT Pub. Date: Nov. 9, 2017

(65) Prior Publication Data
US 2019/0123529 A1 Apr. 25, 2019

Related U.S. Application Data

(60) Provisional application No. 62/332,674, filed on May 6, 2016.

(51) Int. Cl.
*H02G 3/03* (2006.01)
*H02G 3/04* (2006.01)
(Continued)

(52) U.S. Cl.
CPC ............... *H02G 3/03* (2013.01); *H02G 1/08* (2013.01); *H02G 3/0406* (2013.01); *H02G 3/0437* (2013.01); *H02G 3/30* (2013.01)

(58) Field of Classification Search
CPC .......... H02G 3/03; H02G 3/30; H02G 3/0406; H02G 1/08; H02G 3/0437
(Continued)

(56) References Cited

U.S. PATENT DOCUMENTS 3,622,687 A * 11/1971 Doughty .............. H01B 7/0838
174/97
3,680,817 A 8/1972 Gogan
(Continued)

FOREIGN PATENT DOCUMENTS

| JP | 2005-080449 A | 3/2005 |
| NL | 7 807 268 A | 1/1980 |
| WO | 2009/074772 A2 | 6/2009 |

OTHER PUBLICATIONS

Extended European Search Report for European Patent Application No. 17793547.5 dated Oct. 22, 2019, 9 pages.
(Continued)

*Primary Examiner* — Sherman Ng
(74) *Attorney, Agent, or Firm* — Merchant & Gould P.C.

(57) ABSTRACT

A cable tray includes first and second opposite tray walls and at least one divider arrangement between the tray walls. The divider arrangement includes first and second divider walls joined to each other with a cooling volume between them. A first cable channel is defined between the first tray wall and the first divider wall. A second cable channel is spaced from the first cable channel by the cooling volume and is defined between the second divider wall and at least one of the second tray wall or an additional divider wall. The tray can be used in methods of laying cable. The tray can be part of a ladder rack.

21 Claims, 5 Drawing Sheets

(51) Int. Cl.
*H02G 1/08* (2006.01)
*H02G 3/30* (2006.01)
(58) Field of Classification Search
USPC ...................................................... 174/70 C
See application file for complete search history.

(56) References Cited

U.S. PATENT DOCUMENTS

| | | |
|---|---|---|
| 6,078,714 A | 6/2000 | Cavanaugh |
| 6,631,875 B1 | 10/2003 | Kampf et al. |
| 6,708,918 B2 | 3/2004 | Ferris et al. |
| 6,810,191 B2 | 10/2004 | Ferris et al. |
| 6,934,456 B2 | 8/2005 | Ferris et al. |
| 7,083,051 B2 | 8/2006 | Smith et al. |
| 7,113,685 B2 | 9/2006 | Ferris et al. |
| 7,224,880 B2 | 5/2007 | Ferris et al. |
| 7,469,090 B2 | 12/2008 | Ferris et al. |
| 7,677,400 B2 | 3/2010 | Bayazit et al. |
| 7,939,759 B2 | 5/2011 | Henry |
| 8,193,450 B1 | 6/2012 | Kam |
| 8,217,266 B2 | 7/2012 | Caveney et al. |
| 8,950,051 B2 | 2/2015 | Kampf et al. |
| 9,166,389 B2 * | 10/2015 | Viviant .................... H02G 3/32 |
| 2005/0045357 A1 * | 3/2005 | Ichikawa ............. H02G 3/0431 174/50 |
| 2007/0267214 A1 * | 11/2007 | Cardi ................... H02G 3/0406 174/97 |
| 2010/0019106 A1 * | 1/2010 | Sisley .................. H02G 3/0406 248/68.1 |
| 2010/0084189 A1 | 4/2010 | Cardi |
| 2012/0111598 A1 | 5/2012 | Pawluk |
| 2015/0036992 A1 | 2/2015 | Fleming et al. |
| 2017/0104319 A1 * | 4/2017 | Ojerstav .............. H02G 3/0443 |

OTHER PUBLICATIONS

International Search Report and Written Opinion of the International Searching Authority for International Patent Application No. PCT/US2017/031565 dated Aug. 8, 2017, 11 pages.
"FLEXTRAY™ wire basket, B-Line Series", Eaton, 64 pages (2015).
"ADC FiberGuide® System: Express Exit™ 2X2", ADC Telecommunications, Inc., 2 pages (1999).
"FiberGuide® Fiber Management Systems", ADC Telecommunications, Inc., 21 pages (1998).
"Plenum FiberGuide® Fiber Management System", ADC Telecommunications, Inc., 7 pages (1993).

* cited by examiner

OPTIMIZED CABLE RACEWAY AND METHODS

CROSS-REFERENCE TO RELATED APPLICATION

This application is a National Stage of PCT/US2017/031565, filed on May 8, 2017, which claims the benefit of U.S. Patent Application Ser. No. 62/332,674, filed on May 6, 2016, the disclosures of which are incorporated herein by reference in their entireties. To the extent appropriate, a claim of priority is made to each of the above disclosed applications.

TECHNICAL FIELD

This application relates to a rack, cable tray, or raceway for routing cables. In particular, this disclosure relates to a rack, cable tray, or raceway for separating cables into separate bundles to assist in the mitigation of heat buildup.

BACKGROUND

Data centers and central offices typically use racks or cable trays to support data cables and other types of cables and wiring.

In some instances, the cables can be heat producing. For example, in Power over Ethernet (PoE) cables, electrical current is run to networking hardware over Ethernet data cabling. This produces heat. When cables that generate heat are bundled together, there can be some potential damages or dangers introduced.

What is needed is a way to route cables neatly while at the same time assisting in mitigation of heat.

SUMMARY

In accordance with principles of this disclosure, a cable tray is provided. The cable tray includes structure that assists in heat mitigation in order to overcome the problems of the prior art.

The cable tray can include first and second opposite tray walls defining an inner volume therebetween. At least one divider arrangement is oriented between the first and second tray walls. The divider arrangement includes a first divider wall and a second divider wall joined to each other and having a cooling volume therebetween. A first cable channel is defined between the first tray wall and the first divider wall. A second cable channel is spaced from the first cable channel by the cooling volume and is defined between the second divider wall and at least one of the second tray wall or an additional divider wall.

In some embodiments, the first and second cable channels each has an open mouth along the channel for receiving cables therein.

In some embodiments, a base is opposite the open mouths joining the first and second tray walls. In some implementations, the at least one divider arrangement comprises an insert oriented over the base and between the first and second tray walls.

In some implementations, a base is opposite of the open mouths, and the base is formed at least partially by the divider arrangement.

In one or more embodiments, the first divider wall and second divider wall are joined together at a location opposite of the base.

In some implementations, the first cable channel and the second cable channel each has a U-shaped cross-section.

In one or more examples, the U-shaped cross-section includes a plurality of straight, non-curved segments.

In some embodiments, the U-shaped cross-section includes parallel sides.

In some implementations, the U-shaped cross-section includes a pair of sides diverging away from each other.

In one or more embodiments, the first cable channel and the second cable channel each has a trapezoid-shaped cross-section.

In some examples, the trapezoid-shaped cross-section includes a pair of sides diverging away from each other.

In some embodiments, the cooling volume has a triangle-shaped cross-section.

In some embodiments, the cooling volume has a cross-sectional shape that is greatest in width adjacent a base opposite the open mouths.

In one or more embodiments, the first cable channel and the second cable channel each has a round cross-section.

In some implementations, the cooling volume has a cross-sectional shape narrowest in width at a location spaced between a base and the open mouths.

In some embodiments, the at least one divider arrangement comprises a plurality of divider arrangements oriented between the first and second tray walls. Each divider arrangement includes a first divider wall and a second divider wall joined to each other and having a cooling volume therebetween. A plurality of cable channels is formed between the first and second divider walls of different divider arrangements.

In some implementations, the first and second tray walls and the at least one divider arrangement comprises a mesh grid.

In some implementations, the first and second tray walls and the at least one divider arrangement comprises metal.

In some embodiments, the first and second tray walls and the at least one divider arrangement comprises plastic.

In one or more embodiments, the divider arrangement has a length that is as long as at least 50% of the length of the first and second tray walls.

In some examples, the divider arrangement has a length that is as long as a length of the first and second tray walls.

In some embodiments, the cable tray is at least one foot long.

In some embodiments, the cable tray extends linear over at least a majority of the length.

In some embodiments, the cable tray is mounted to a wall or ceiling.

In accordance with principles of this disclosure, a cable system is provided including the cable tray as variously characterized above and further including a first bundle of cables held by first cable channel, and a second bundle of cables held by the second cable bundle.

In one or more implementations, the first and second bundle of cables includes Power over Ethernet (PoE) cables.

In accordance with principles of this disclosure, a method of laying cable is provided. The method includes bundling a first group of cables; laying the first group of cables in a first cable channel of a cable tray; bundling a second group of cables; and laying the second group of cables in a second cable channel of the cable tray. The second cable channel is adjacent to and spaced from the first cable channel by a cooling volume.

The method can include using a cable tray as variously characterized above.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
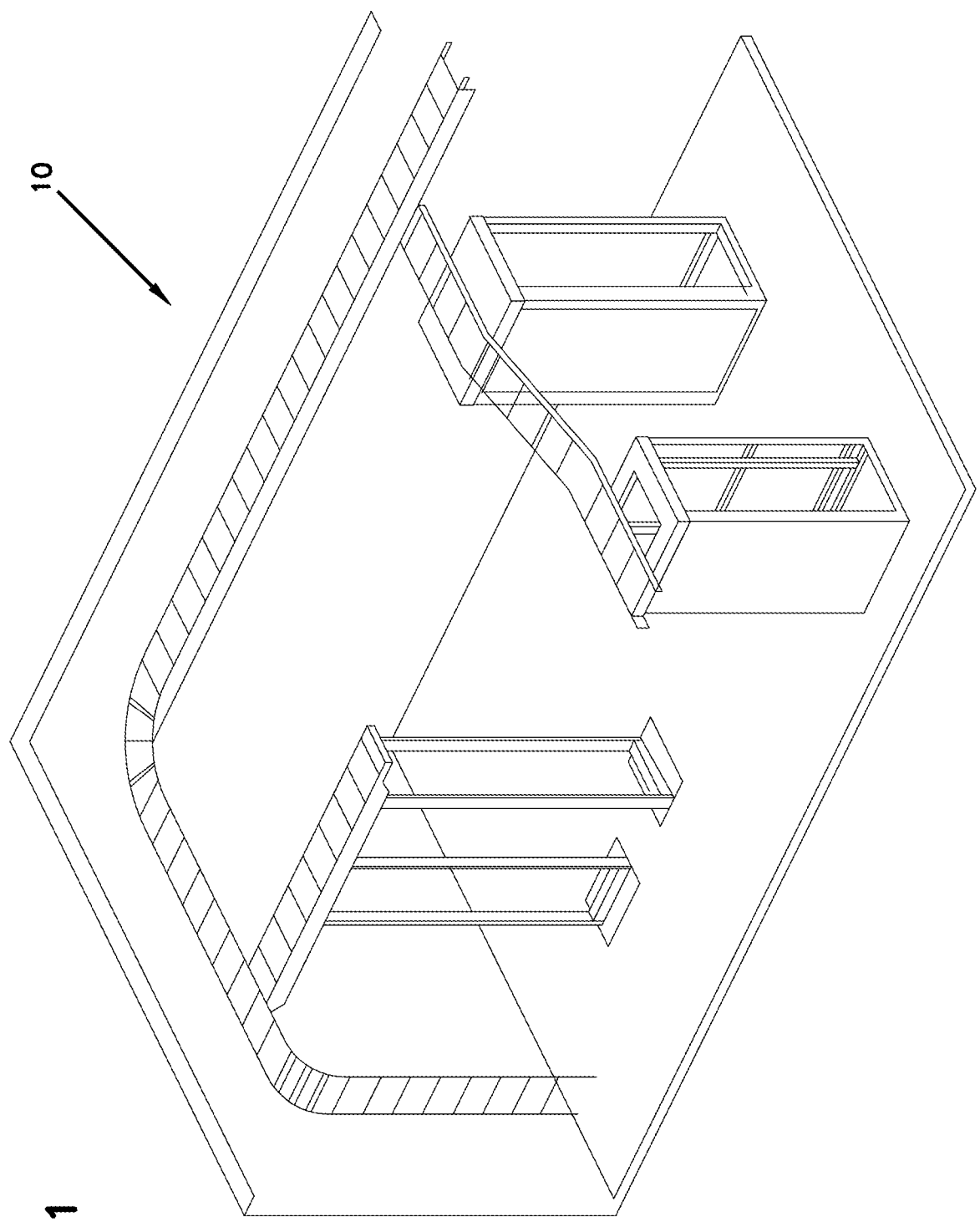
FIG. 1 is a schematic perspective view of a ladder rack that can be used with a cable tray in accordance with principles of this disclosure.

FIG. 1 illustrates an example ladder rack 10. The ladder rack 10 is used to support and route cables, typically above equipment, cabinets, and other equipment. The ladder rack 10 can be mounted to a wall or from a ceiling, for example.

Cables or wires can be routed directly on the ladder rack 10. In some instances, the ladder rack 10 can include sides for containing the cables within a channel formed between the sides. For example, this may be in the form of a cable tray.

Figure 2:
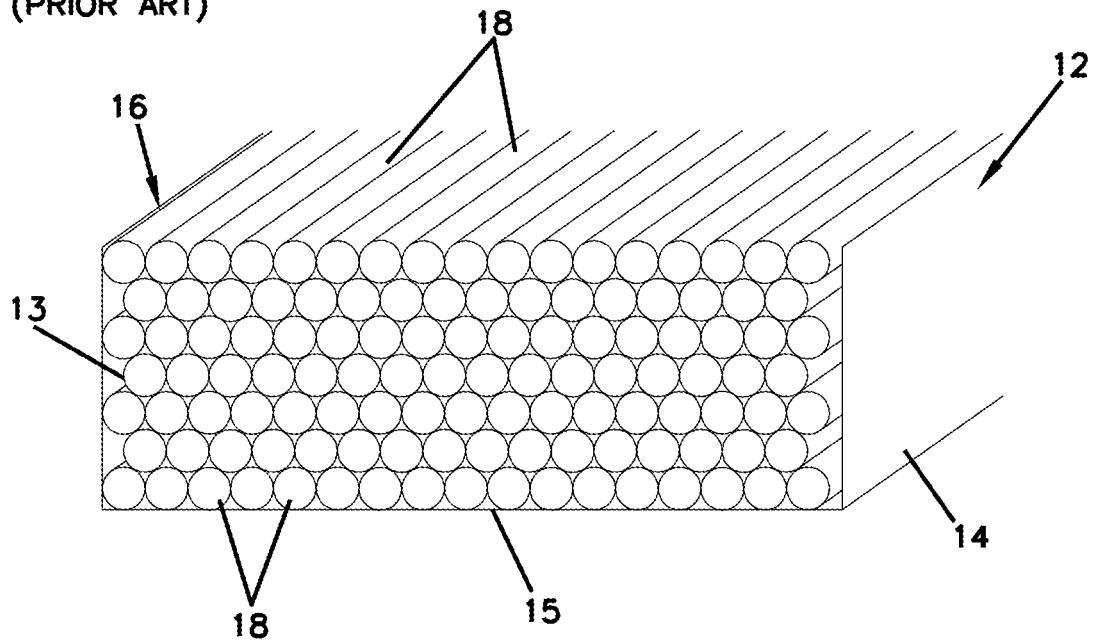
FIG. 2 is a schematic, perspective view of a prior art cable tray.

A prior art cable tray is shown in FIG. 2 at reference numeral 12. In FIG. 2, the cable tray 12 includes first and second opposite tray walls 13, 14 and a tray base 15 therebetween. The tray walls 13, 14 and the base 15 define a cable channel 16 therewithin. The cable channel 16 is for holding and routing a plurality of cables 18. As can be seen by the view in FIG. 2, all of the cables 18 are in one single bundle. If the cables 18 produce heat, such as an example of PoE cables, heat is generated. By having all of the cables 18 in one bundle, effective heat dissipation and mitigation is a problem.

FIGS. 3-7 illustrate various embodiments of cable trays 20 that solve the problem of heat dissipation and mitigation of cables. Wherever possible, the same reference numerals will be used throughout FIGS. 3-7 to refer to the same or like parts.

In accordance with principles of this disclosure, the cable tray includes a first tray wall 22 and a second opposite tray wall 24. The first tray wall 22 and second tray wall 24 define an inner volume 26 therebetween. Typically, the first tray wall 22 and second tray wall 24 will be linear and straight over the majority of the length of the tray 20. Of course, in some embodiments, there can be curves or corners. The first tray wall 22 and second tray wall 24 will, in many instances, be parallel to each other, but in other embodiments, can have sections where they are not parallel to each other. The first tray wall 22 and second tray wall 24 will generally have a height that is long enough to contain a bundle of cables 18 there within. The height can be at least one inch, not greater than 24 inches.

In accordance with principles of this disclosure, the cable tray 20 includes at least one divider arrangement 30. The divider arrangement 30 is oriented between the first and second tray walls 22, 24. Many embodiments are possible. In many example embodiments, the divider arrangement 30 includes a first divider wall 32 and a second divider wall 34. The first divider wall 32 and second divider wall 34 are joined to each other. There is a cooling volume 36 between the first divider wall 32 and second divider wall 34. The cooling volume 36 is described further below, but in general, it is an open volume that allows for the flow of fluid, such as air, therethrough. The fluid, such as air, flows along the cooling volume 36 and helps to dissipate heat from the cable tray 20.

A first cable channel 38 is defined between the first tray wall 22 and the first divider wall 32. The first cable channel 38 is for routing or conveying one or a bundle of cables 18 in the cable tray 20 between destinations.

A second cable channel 40 is spaced from the first cable channel 38 by the cooling volume 36. The second cable channel 40 is defined between the second divider wall 34 and at least one of the second tray wall 24 or an additional divider wall of another divider arrangement 30. This is described further below.

Each of the first and second cable channels 38, 40 has an open mouth 42, 44 along the channel 38, 40 for receiving cables therein. In this manner, cables 18 can be laid within the channels 38, 40 by putting them through the mouth 42, 44 and into the respective channel 38, 40.

The cable tray 20 includes a base 46. The base 46 is opposite of the open mouths 42, 44. The base 46 is generally between the first and second tray walls 22, 24. In some example embodiments, the base 46 extends in generally a straight and planar manner between the first tray wall 22 and second tray wall 24. In other embodiments, the base 46 is formed at least partially by the divider arrangement 30.

For example, in embodiments in which the base 46 extends along a generally straight and planar extension between the tray walls 22, 24, the at least one divider arrangement 30 can include a separate insert 48 (FIG. 8) that is oriented over the base 46 and between the first and second tray walls 22, 24. FIGS. 3-7 illustrate the base 46 being formed at least partially by the divider arrangement 30.

As mentioned above, in many example embodiments, the first divider wall 32 and second divider wall 34 are joined together. In many example implementations, they are joined together at a joint 50 or location that is opposite of the base 46.

Figure 3:
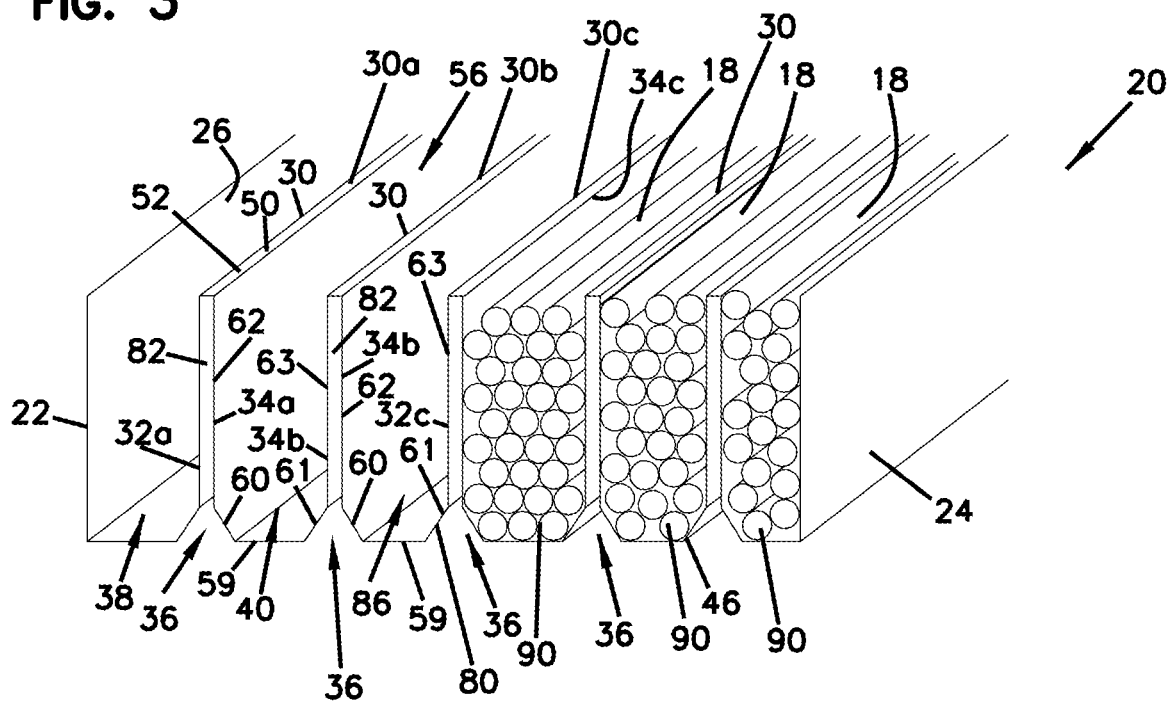
FIG. 3 is a schematic, perspective view of a first embodiment of a cable tray constructed in accordance with principles of this disclosure.
Figure 4:
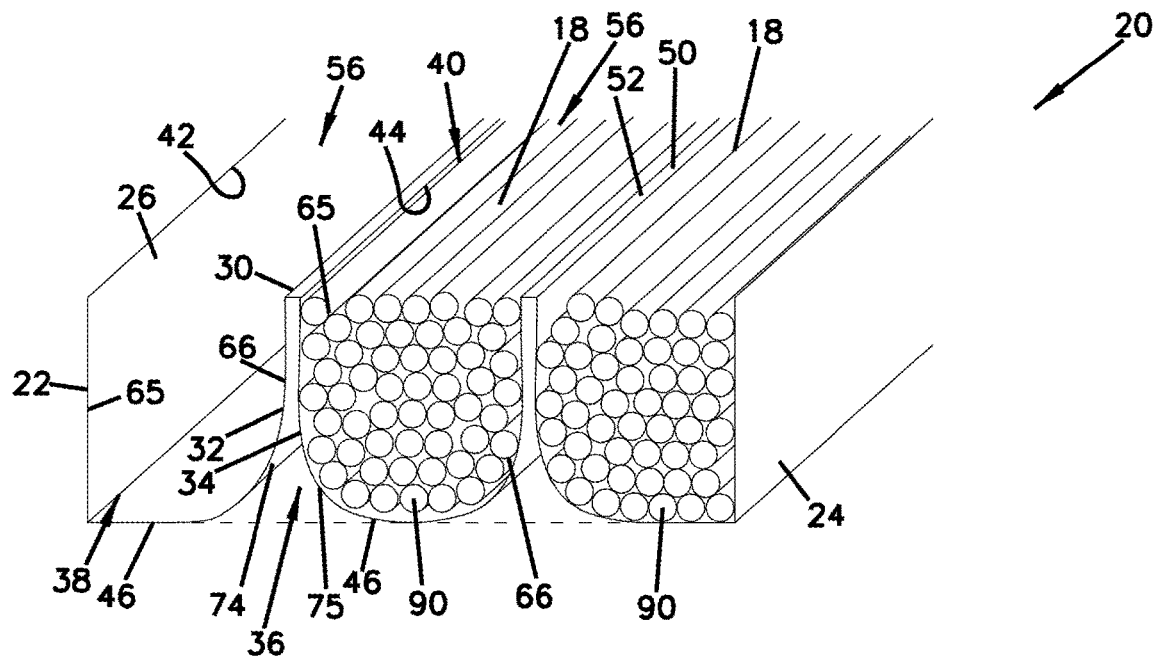
FIG. 4 is a schematic, perspective view of a second embodiment of a cable tray constructed in accordance with principles of this disclosure.
Figure 5:
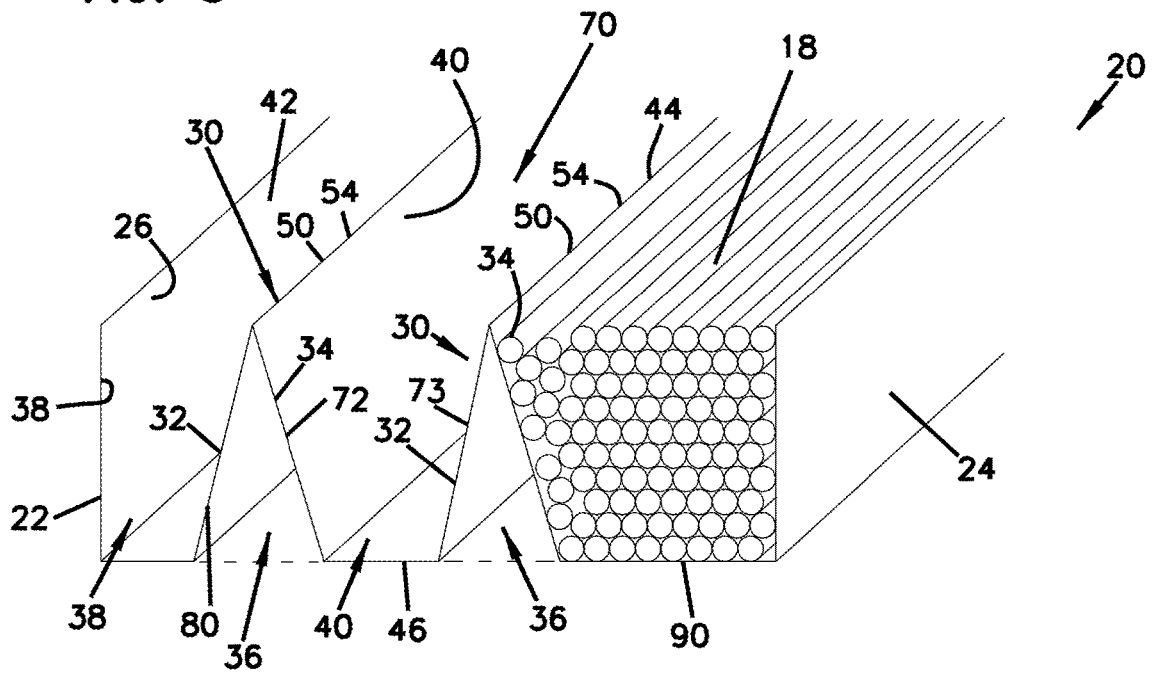
FIG. 5 is a schematic, perspective view of a third embodiment of a cable tray constructed in accordance with principles of this disclosure.
Figure 6:
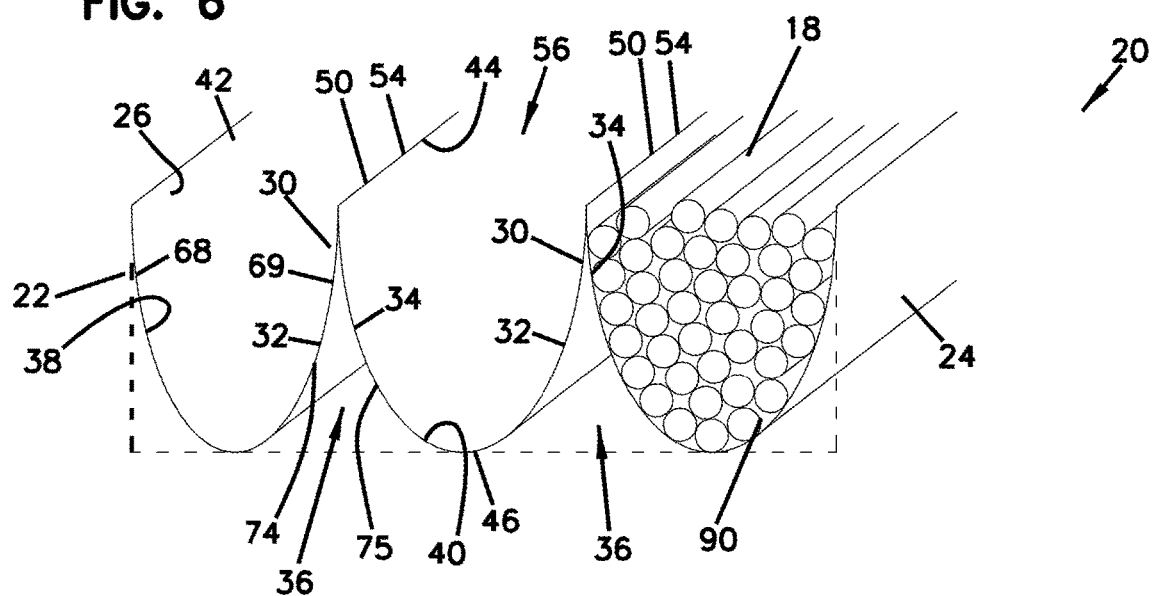
FIG. 6 is a schematic, perspective view of a fourth embodiment of a cable tray constructed in accordance with principles of this disclosure.
Figure 7:
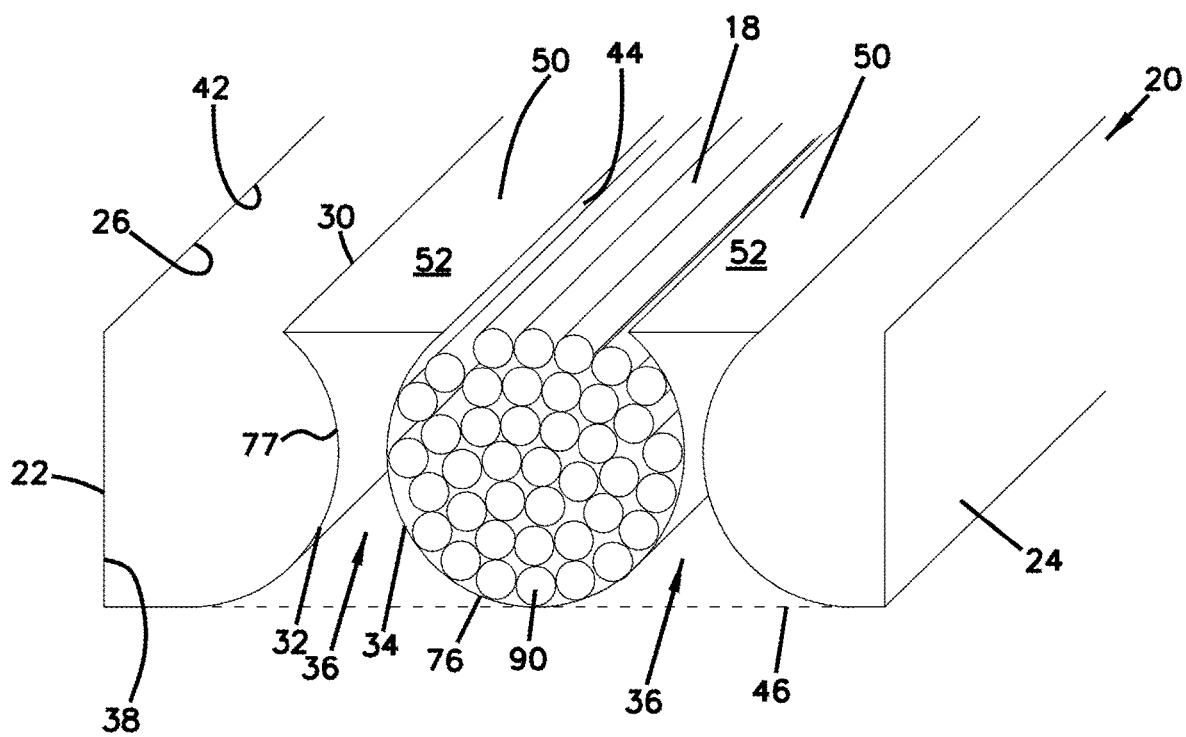
FIG. 7 is a schematic, perspective view of a fifth embodiment of a cable tray constructed in accordance with principles of this disclosure.
Figure 8:
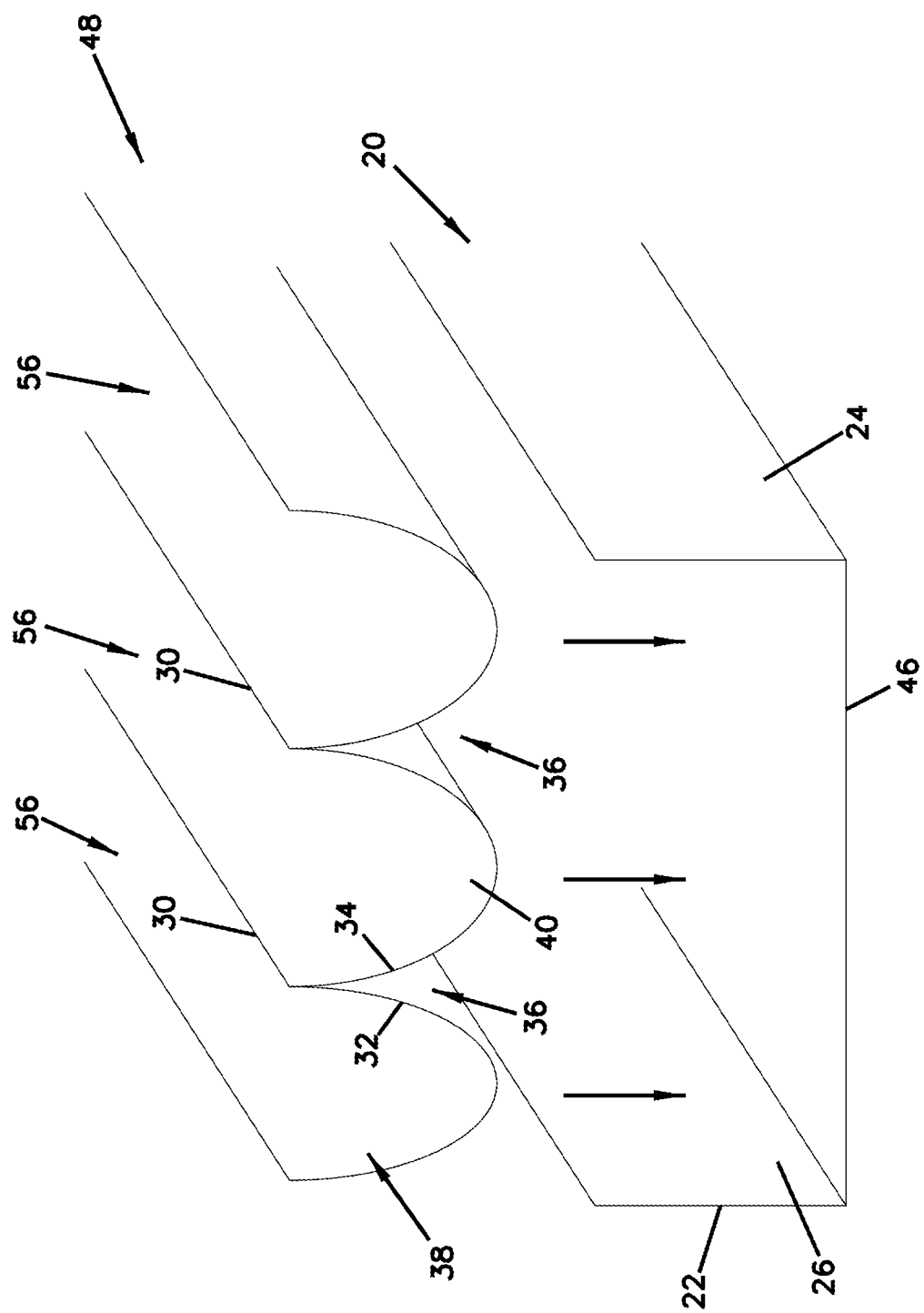
FIG. 8 is a schematic, perspective view of a cable tray and divider arrangement insert, constructed in accordance with principles of this disclosure.

The joint 50 can be embodied in many different forms. In FIGS. 3, 4, and 7, the joint 50 is generally a flat, straight segment 52. In FIGS. 5 and 6, the joint 50 is an apex 54, forming generally a point, which can be a rounded point. Many different embodiments are possible.

The first and second cable channels 38, 40 can have many different cross-sectional shapes. In one or more implementations, the first cable channel 38 and second cable channel 40 each has a U-shaped cross-section 56 (FIGS. 3, 4, 6, and 8).

In FIG. 3, the U-shaped cross-section 56 includes a plurality of straight, non-curved segments 58. For example, in FIG. 3, a first straight, linear segment 59 forms the base 46. Extending and angled up from each end of the first segment 59 are second segments 60, 61. Angled from and extending from second segments 60, 61 are third segments 62, 63. Third segments 62, 63 can be generally parallel to the first and second tray walls 22, 24, in some embodiments. In other embodiments, they may be angled relative to the first and second tray walls 22, 24. The third segments 62, 63 form a majority of the divider walls 32, 34 of adjacent divider arrangements 30. For example, the third segment 62 of one divider arrangement 30 is adjacent to but spaced from third segments 63 of the adjacent divider arrangement 30. Between the third segment 62 and third segment 63 of the adjacent divider arrangement 30 is the cooling volume 36.

In FIG. 4, the U-shaped cross-section 56 includes the base 46 and generally parallel sides 65, 66. The sides 65, 66 curve smoothly to the base 46.

In FIG. 6, the U-shaped cross-section 56 has sides 68, 69 that are curved from and transitioned from the base 46. The sides 68, 69 in FIG. 6 diverge away from each other as they extend from the base 46 to the mouths 42, 44.

Of course, other embodiments can include other cross-sectional shapes for the channels 38, 40. In FIG. 5, the first and second cable channels 38, 40 each has a trapezoid-shaped cross-section 70. In the example implementation shown in FIG. 5, the trapezoid-shaped cross-section 70 includes a pair of sides 72, 73 that diverge away from each other as they extend from the base 46 to the open mouths 42, 44. In other embodiments, the sides could be at different angles.

In the embodiment of FIG. 7, at least the second cable channel 40 has a generally round cross-section 76. The first cable channel 38 has a portion 77 of it (the portion 77 formed by the divider arrangement 30) with a rounded cross-section.

In the embodiment of FIGS. 3-6, the cooling volume 36 has a cross-sectional shape that is greatest in width adjacent the base 46. In FIGS. 3-6, there is at least a portion of the cooling volume 36 that has a triangle-shaped cross-section 80. In FIG. 3, the triangle cross-section 80 is adjacent to the base 46, and then there is a rectangular cross-section 82 between the triangular cross-section 80 and the segment 52 forming the joint 50.

In FIG. 5, the cooling volume 36 is completely formed by the triangular cross-section 80.

FIGS. 4 and 6 have the cooling volume 36 formed by a somewhat triangular shape with curved sides 74, 75.

In FIG. 7, the cross-section for the cooling volume 36 has a width that is about the same adjacent the base 46 and at the segment 52 forming the joint 50. In between, there are curved sides. In the FIG. 7 embodiment, the cooling volume 36 is narrowest in width at a location axially spaced between the base 46 and the open mouths 42, 44.

In accordance with the principles of this disclosure, the cable tray 20 can include a plurality of divider arrangements 30 oriented between the first tray wall 22 and second tray wall 24. Each divider arrangement 30 has the first divider wall 32 and second divider wall 34 with the cooling volume 36 therebetween. A plurality of cable channels, such as channels 38, 40 are formed between the first and second divider walls 32, 34 of different divider arrangements. For example, in FIG. 3, a first divider arrangement 30 is shown at 30a. The first divider arrangement 30a has first divider wall 32a and second divider wall 34a. Adjacent to the first divider arrangement 30a is a second divider arrangement 30b, having first divider wall 32b and second divider wall 34b. Adjacent to the second divider arrangement 30b is a third divider arrangement 30c, having first divider wall 32c and second divider wall 34c. Located between the first tray wall 22 and the first divider wall 32a is the first cable channel 38. Located between the second divider wall 34a and the first divider wall 32b of the second divider arrangement 30b is the second cable channel 40. Located between the second divider wall 34b of the second divider arrangement 30b and the first divider wall 32c of the third divider arrangement 30c is another cable channel 86. This pattern continues until reaching the second tray wall 24. In some embodiments, there can be only a single divider arrangement 30. In other arrangements, there can be two or more divider arrangements 30.

The at least one divider arrangement herein 30 has a length that is as long as at least 50% of a length of the first tray wall 22 and second tray wall 24. In some implementations, the at least one divider arrangement 30 has a length that is just about or as long as a length of the first and second tray walls 32, 34 such that the divider arrangement 30 extends an entire length of the cable tray 20.

The cable tray 20 can extend at least one foot long, and in many implementations, it may extend linear over at least a majority of the length.

As shown in FIG. 1, the cable tray 12 can be mounted as part of the ladder rack 10 and can be mounted to a wall or ceiling.

The first and second tray walls 22 and at least one divider arrangement 30 can comprise a mesh grid to assist with heat mitigation. In some embodiments, the first and second tray walls 22, 24 and the at least one divider arrangement 30 can comprise metal. In other embodiments, the first and second tray walls 22, 24 and the at least one divider arrangement 30 can comprise plastic.

FIGS. 2-7 show the cables 18 held in bundles 90 within the cable channels 38, 40. By keeping the cables 18 in bundles 90 that are separated by the cooling volume 36, heat produced by the cables 18 is more easily dissipated as compared to the prior art arrangement of FIG. 2. This is especially true when the cables 18 are in the form of PoE cables.

The cable tray 20 can be used in a method of laying cable. The method can include bundling a first group of cables and laying the first group of cables in the first cable channel 38 of the cable tray 20. This is generally done by passing the bundle 90 of cables 18 through the mouth 42 and laying the cables 18 along the base 46.

The method also can include bundling a second group of cables 18 and laying the second group of cables 18 in the second cable channel 40 of the cable tray 20. This can be done by placing the second group of cables 18 through the mouth 44 and laying them against the base 46. The second cable channel 40 is adjacent to and spaced from the first cable channel 38 by the cooling volume 36. The cooling volume 36 will help to mitigate heat generated by the first and second bundles 90 of cables 18.

The method of laying cable can include using the cable tray 20 as generally characterized herein, including having first and second opposite tray walls 22, 24 and at least one divider arrangement 30 in between the first and second tray walls 22, 24. The divider arrangement 30 can include first divider wall 32 and second divider wall 34 joined to each other with the cooling volume 36 therebetween.

Having described example aspects and implementations of the present disclosure, modifications and equivalents of the disclosed concepts may readily occur to one skilled in the art. Many embodiments can be made utilizing the principles of this disclosure.

What is claimed is:

1. A cable tray comprising:
   (a) first and second opposite tray walls defining an inner volume therebetween;
   (b) at least one divider arrangement oriented between the first and second tray walls, the divider arrangement including,
      (i) a first divider wall and a second divider wall joined to each other and having a cooling volume therebetween;
   (c) a first cable channel defined between the first tray wall and the first divider wall; the first cable channel having an open mouth along the first cable channel for receiving cables therein;
   (d) a second cable channel spaced from the first cable channel by the cooling volume and defined between the second divider wall and at least one of the second tray wall or an additional divider wall; the second cable channel having an open mouth along the second cable channel for receiving cables therein; and
   (e) a base opposite the open mouths joining the first and second tray walls;
wherein the at least one divider arrangement comprises an insert oriented over the base and between the first and second tray walls.

2. The cable tray of claim 1 wherein:
   (a) the first divider wall and second divider wall are joined together at a location opposite of the base.

3. The cable tray of claim 1 wherein:
   (a) the first cable channel and the second cable channel each has a U-shaped cross-section.

4. The cable tray of claim 3 wherein:
   (a) the U-shaped cross-section includes a plurality of straight, non-curved segments.

5. The cable tray of claim 3 wherein:
   (a) the U-shaped cross-section includes parallel sides.

6. The cable tray of claim 3 wherein:
   (a) the U-shaped cross-section includes a pair of sides diverging away from each other.

7. The cable tray of claim 1 wherein:
   (a) the first cable channel and the second cable channel each has a trapezoid-shaped cross-section.

8. The cable tray of claim 7 wherein:
   (a) the trapezoid-shaped cross-section includes a pair of sides diverging away from each other.

9. The cable tray of claim 8 wherein:
   (a) the cooling volume has a triangle-shaped cross-section.

10. The cable tray of claim 3 wherein:
    (a) the cooling volume has a cross-sectional shape greatest in width adjacent a base opposite of the open mouths.

11. The cable tray of claim 1 wherein:
    (a) the first cable channel and the second cable channel each has a round cross-section.

12. The cable tray of claim 11 wherein:
    (a) the cooling volume has a cross-sectional shape narrowest in width at a location spaced between a base and the open mouths.

13. The cable tray of claim 1 wherein:
    (a) the at least one divider arrangement comprises a plurality of divider arrangements oriented between the first and second tray walls, each divider arrangement including,
       (i) a first divider wall and a second divider wall joined to each other and having a cooling volume therebetween; and
    wherein a plurality of cable channels are formed between first and second divider walls of different divider arrangements.

14. The cable tray of claim 1 wherein:
    (a) the first and second tray walls and the at least one divider arrangement comprises a mesh grid.

15. The cable tray of claim 1 wherein:
    (a) the first and second tray walls and the at least one divider arrangement comprises one of metal or plastic.

16. The cable tray of claim 1 wherein:
    (a) the divider arrangement has a length that is as long as at least 50% of a length of the first and second tray walls.

17. The cable tray of claim 1 wherein:
    (a) the divider arrangement has a length that is as long as a length of the first and second tray walls;
    (b) the cable tray is at least one foot long; and
    (c) the cable tray extends linear over at least a majority of the length.

18. The cable tray of claim 1 wherein:
    (a) the cable tray is mounted to a wall or ceiling.

19. A cable system comprising the cable tray of claim 1, further comprising:
    (a) a first bundle of cables held by the first cable channel; and
    (b) a second bundle of cables held by the second cable channel.

20. The cable system of claim 19 wherein:
    (a) the first and second bundle of cables include power over Ethernet (PoE) cables.

21. A method of laying cable, the method comprising:
    (a) providing a cable tray having first and second opposite tray walls defining an inner volume therebetween and having a base joining the first and second tray walls;
    (b) providing a divider arrangement oriented between the first and second tray walls; the divider arrangement comprising an insert oriented over the base and between the first and second tray walls; the divider arrangement including a first divider wall and a second divider wall joined to each other and having a cooling volume therebetween;
    (c) bundling a first group of cables;
    (d) laying the first group of cables in a first cable channel defined between the first tray wall and the first divider wall; the first cable channel having an open mouth along the first cable channel for receiving cables therein;
    (e) bundling a second group of cables; and
    (f) laying the second group of cables in a second cable channel defined between the second divider wall and at least one of the second tray wall or an additional divider wall; the second cable channel having an open mouth along the second cable channel for receiving cables therein.

* * * * *